United States Patent
Jenkins et al.

(10) Patent No.: US 7,734,613 B2
(45) Date of Patent: Jun. 8, 2010

(54) ENABLING A USER TO CREATE A MINI INFORMATION CENTER THEREBY REDUCING THE TIME NEEDED FOR THE USER TO OBTAIN THE DESIRED INFORMATION

(75) Inventors: Jana Helton Jenkins, Raleigh, NC (US); Beth Monica Pursley, Wendell, NC (US); Ying Xiao, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 11/265,896

(22) Filed: Nov. 3, 2005

(65) Prior Publication Data
US 2007/0100870 A1 May 3, 2007

(51) Int. Cl.
G06F 7/00 (2006.01)
G06F 17/00 (2006.01)
(52) U.S. Cl. ............... 707/708; 707/728; 707/740
(58) Field of Classification Search ........... 707/102, 707/104.1, 100
See application file for complete search history.

(56) References Cited

U.S. PATENT DOCUMENTS

| | | | |
|---|---|---|---|
| 6,055,543 A | 4/2000 | Christensen et al. ......... 707/14 |
| 6,563,514 B1 * | 5/2003 | Samar ........................ 715/711 |
| 6,694,359 B1 | 2/2004 | Morris et al. ............... 709/219 |
| 6,727,927 B1 * | 4/2004 | Dempski et al. ........... 715/853 |
| 6,741,992 B1 | 5/2004 | McFadden .................. 707/10 |
| 6,810,394 B2 * | 10/2004 | Coutts et al. .................. 707/3 |
| 6,865,568 B2 | 3/2005 | Chau ............................ 707/3 |
| 6,938,203 B1 | 8/2005 | Dimarco et al. ............ 715/513 |
| 2002/0095460 A1 | 7/2002 | Benson ..................... 709/204 |
| 2003/0140055 A1 * | 7/2003 | Doney et al. ............... 707/101 |
| 2004/0139107 A1 * | 7/2004 | Bachman et al. ......... 707/104.1 |
| 2004/0210829 A1 * | 10/2004 | Cristofari et al. ......... 715/501.1 |
| 2004/0230572 A1 | 11/2004 | Omoigui ....................... 707/3 |

(Continued)

OTHER PUBLICATIONS

Gisli R. Hjaltason et al., "Index-Driven Similarity Search in Metric Spaces," *ACM Transactions on Database Systems*, vol. 28, No. 4, Dec. 2003, pp. 517-580.

(Continued)

*Primary Examiner*—James Trujillo
*Assistant Examiner*—Bruce M Moser
(74) *Attorney, Agent, or Firm*—Robert A. Voigt, Jr.; Winstead, P.C.

(57) ABSTRACT

A method, computer program product and system for creating a mini information center. A user is presented with an initial set of questions to answer. Based on these answers, topics of interests are identified. These topics of interests are presented to the user. Each topic of interest may be associated with one or more articles. The user may then select the articles that are of interest to the user. Upon selection of each article, the user may be presented with a list of options including the option of storing the selected article and associated topic in a directory which will later be used to build a mini information center. Once the user has completed the selection of articles of interest, the mini information center is built using the stored selected articles and associated topics thereby enabling the user to access the desired information in the information center using less time.

20 Claims, 4 Drawing Sheets

U.S. PATENT DOCUMENTS

| | | | |
|---|---|---|---|
| 2005/0044110 A1* | 2/2005 | Herzenberg et al. | 707/104.1 |
| 2005/0149538 A1* | 7/2005 | Singh et al. | 707/100 |
| 2005/0154702 A1 | 7/2005 | Liu et al. | 707/1 |
| 2006/0235886 A1* | 10/2006 | Norman | 707/104.1 |
| 2007/0022135 A1* | 1/2007 | Malik | 707/102 |

OTHER PUBLICATIONS

R. Lempel et al., "SALSA: The Stochastic Approach for Link-Structure Analysis," *ACM Transactions on Information Systems*, vol. 19, No. 2, Apr. 2001, pp. 131-160.

* cited by examiner

ENABLING A USER TO CREATE A MINI INFORMATION CENTER THEREBY REDUCING THE TIME NEEDED FOR THE USER TO OBTAIN THE DESIRED INFORMATION

TECHNICAL FIELD

The present invention relates to the field of information centers, and more particularly to enabling a user to create a mini information center thereby reducing the time needed for the user to obtain the desired information.

BACKGROUND INFORMATION

An information center may refer to an information source, such as a website, that may be used for training users in applications and solving related personal computer problems. An information center may contain a listing of thousands of individual topics as well as thousands of electronic documents that are readily available to the user, such as in a PDF format. These electronic documents may be available to the user by the user selecting the appropriate link, displayed on the user's interface, to that document. An example of such an information center is illustrated in FIG. 1.

Referring to FIG. 1, FIG. 1 is a screen shot of an information center 100. Information center 100 may include two separate panes 101, 102. Pane 101 may be referred to as the "topic pane" where the topic pane includes a list of topics, e.g., "information roadmaps", for the user to select. Upon selecting one of these topics, pane 102 may appear that includes a list of articles that relate to the selected topic.

From the standpoint of the user, information centers may seem overwhelming due to the large number of topics and documents available to the user. Since there is so much information readily available to the user, it may be time consuming and cumbersome for the user to find the information desired.

For example, suppose the user is having difficulty installing an application server (application server may refer to software to facilitate the serving or running of other applications) on the user's computer. The user may access the information center, such as a website, to obtain online information to assist the user in installing the application server. However, the user is having difficulty finding the information the user needs to install the application server because there is an overwhelming number of topics and documents displayed in the information center. Hence, the information center, as currently structured, is not easy for the user to find the information they desire. That is, searching through an information center, as currently structured, is not robust and presents a laborious task for the user to find the information desired.

Therefore, there is a need in the art for the user to be able to access the desired information in an information center using less time.

SUMMARY

The problems outlined above may at least in part be solved in some embodiments by allowing the user to determine which articles and associated topics are to be displayed in an information center (referred to herein as the "mini information center"). By allowing the user to create an information center based on these selected articles and topics, the information center will contain informational content targeted to the specific user. By creating an information center that contains informational content targeted to the specific user, the user will be able to access the desired information in the information center using less time.

In one embodiment of the present invention, a method for creating a mini information center may comprise the step of presenting an initial set of questions to a user to answer. The method may further comprise identifying topics of interest based on responses to the initial set of questions from the user. The method may further comprise presenting a list of the identified topics of interest to the user, where each of the identified topics of interest is associated with a short description. Further, each of the identified topics of interest is associated with one or more articles. The method may further comprise receiving indications of articles selected by the user. The method may further comprise presenting a list of options associated with each article selected by the user, where the list of options comprises an option to store an article selected by the user and store an identified topic of interest associated with the selected article in a directory from which to build the mini information center. The method may further comprise building the mini information center based on stored articles and associated topics of interest in the directory.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and system for creating a mini information center. In one embodiment of the present invention, a user is presented on the user's display with an initial set of questions to answer. Based on these answers, topics of interests are identified. These topics of interests may be presented to the user on the user's display. Each topic of interest may be associated with one or more articles. The user may then select the articles that are of interest to the user. Upon selection of each article, the user may be presented on the user's display with a list of options including the option of storing the selected article and associated topic in a directory which will later be used to build a mini information center. Once the user has completed the selection of articles of interest, the mini information center is built using the stored selected articles and associated topics. By allowing the user to create an information center ("mini information center") based on these selected articles and topics, the information center will contain informational content targeted to the specific user. By creating an information center that contains informational content targeted to the specific user, the user will be able to access the desired information in the information center using less time.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 2:
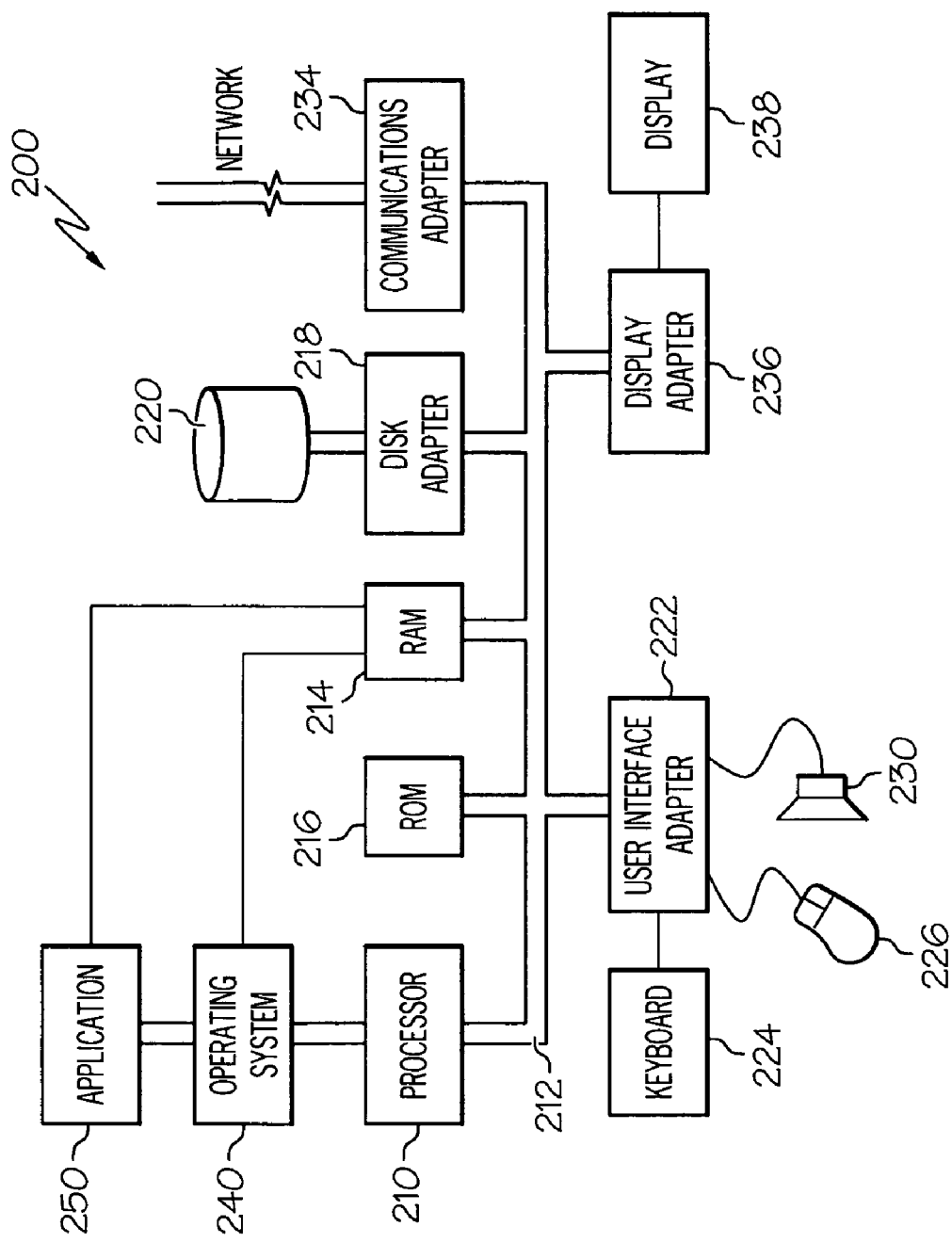
FIG. 2 illustrates an embodiment of the present invention of a computer system.

FIG. 2—Computer System

Figure 3A:
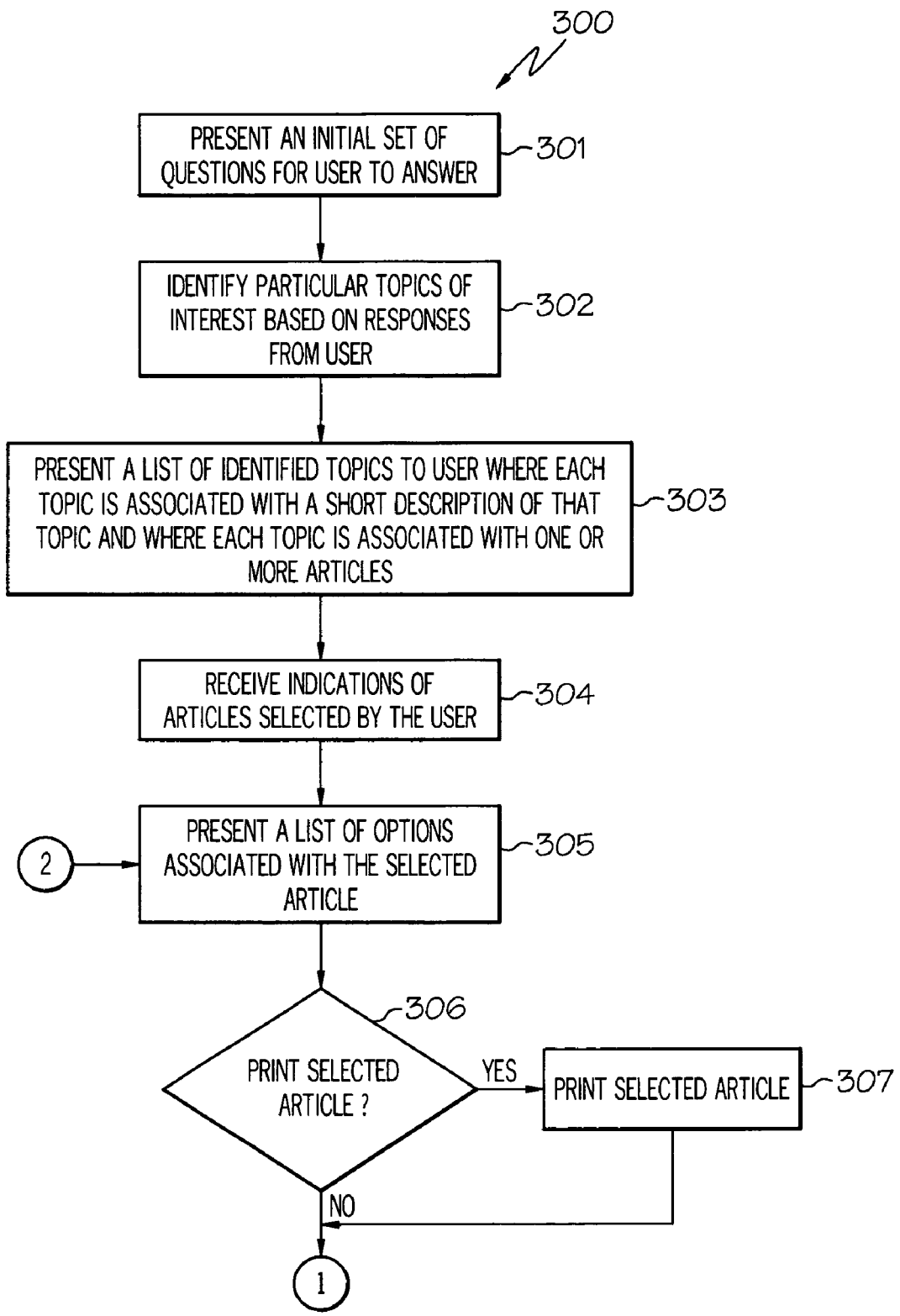
FIGS. 3A and 3B are a flowchart of a method for creating a mini information center in accordance with an embodiment of the present invention.
Figure 3B:
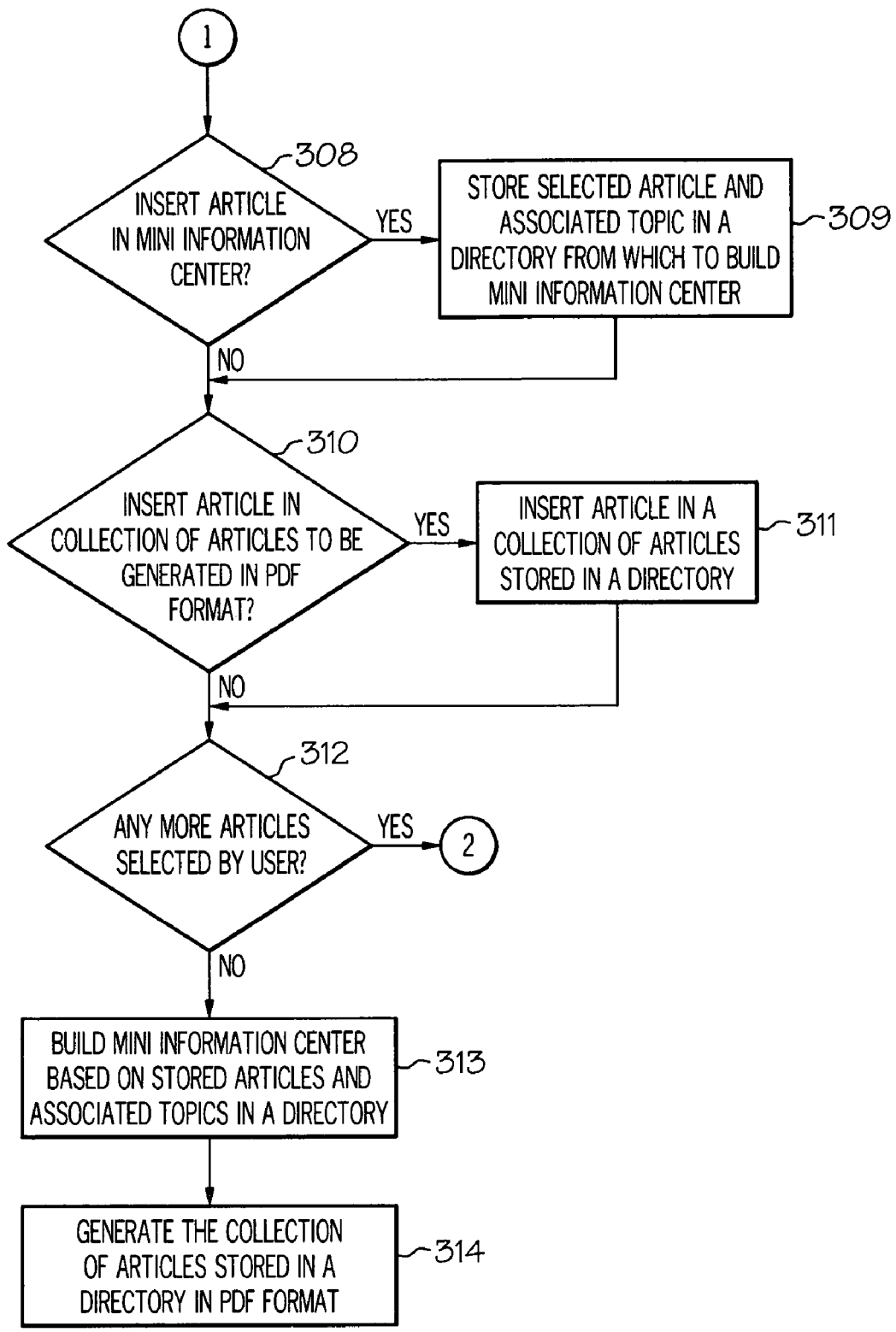

FIG. 2 illustrates a typical hardware configuration of computer system 200 which is representative of a hardware environment for practicing the present invention. Computer system 200 may have a processor 210 coupled to various other components by system bus 212. An operating system 240 may run on processor 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250. Application 250 may include, for example, a program for creating a mini information center (a mini information center may refer to an information center that has the appearance and feel of a normal information center, e.g., information center 100 of FIG. 1, but with less informational content and with informational content that is geared towards the user's specific concern) as discussed in further detail below in association with FIGS. 3A-B. FIGS. 3A-B are a flowchart of a method for creating a mini information center.

Read-Only Memory (ROM) 216 may be coupled to system bus 212 and include a basic input/output system ("BIOS") that controls certain basic functions of computer system 200. Random access memory (RAM) 214 and disk adapter 218 may also be coupled to system bus 212. It should be noted that software components including operating system 240 and application 250 may be loaded into RAM 214 which may be computer system's 200 main memory for execution. Disk adapter 218 may be an integrated drive electronics ("IDE") adapter that communicates with a disk unit 220, e.g., disk drive. It is noted that the program of the present invention that creates a mini information center may reside in disk unit 220 or in application 250. It is further noted that the program of the present invention may be a plug-in to a framework, e.g., a framework developed by the Eclipse Project (www.eclipse.org), of an information center.

Referring to FIG. 2, computer system 200 may further comprise a communications adapter 234 coupled to bus 212. Communications adapter 234 may interconnect bus 212 with an outside network, e.g., Local Area Network (LAN), Wide Area Network (WAN), enabling computer system 200 to communicate with other such systems. I/O devices may also be connected to system bus 212 via a user interface adapter 222 and a display adapter 236. Keyboard 224, mouse 226 and speaker 230 may all be interconnected to bus 212 through user interface adapter 222. Data may be inputted to computer system 200 through any of these devices. A display monitor 238 may be connected to system bus 212 by display adapter 236. In this manner, a user is capable of inputting to computer system 200 through keyboard 224 or mouse 226 and receiving output from computer system 200 via display 238 or speaker 230.

Implementations of the invention include implementations as a computer system programmed to execute the method or methods described herein, and as a computer program product. According to the computer system implementations, sets of instructions for executing the method or methods may be resident in the random access memory 214 of one or more computer systems configured generally as described above. Until required by computer system 200, the set of instructions may be stored as a computer program product in another computer memory, for example, in disk unit 220. Furthermore, the computer program product may also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

As stated in the Background Information section, information centers may seem overwhelming from the standpoint of the user due to the large number of topics and documents available to the user. Since there is so much information readily available to the user, it may be time consuming and cumbersome for the user to find the information desired. For example, suppose the user is having difficulty installing an application server (application server may refer to software to facilitate the serving or running of other applications) on the user's computer. The user may access the information center to obtain online information to assist the user in installing the application server. However, the user is having difficulty finding the information the user needs to install the application server because there are an overwhelming number of topics and documents displayed in the information center. Hence, the information center, as currently structured, is not easy for the user to find the information they desire. That is, searching through an information center, as currently structured, is not robust. Therefore, there is a need in the art for the user to be able to access the desired information in an information center using less time. A user may be able to access the desired information in an information center using less time by allowing the user to create a "mini information center" based on the user's selection of articles of interest. The mini information center may have the appearance and feel of a normal information center (e.g., information center 100 of FIG. 1) but with less informational content. Further, the mini informational center contains informational content that is geared towards the user's specific concerns. A flowchart of a method for enabling the user to create such a mini information center is described below in association with FIGS. 3A-B.

FIGS. 3A-B—Method for Creating a Mini Information Center

FIGS. 3A-B are a flowchart of one embodiment of the present invention of a method 300 for creating a mini information center, which may have the appearance and feel of a normal information center (e.g., information center 100 of FIG. 1) but with less informational content. Further, the mini information center contains informational content that is geared towards the user's specific concerns.

Referring to FIG. 3A, in conjunction with FIG. 2, in step 301, the program of the present invention presents to the user on user's display 238 an initial set of questions for the user to answer. For example, the user may be presented with the question as to what problem the user is trying to solve. In another example, the user may be presented with the question of whether the user would like information regarding setting up a development environment. In another example, the user may be presented with the question of whether the user would like information regarding installing applications.

In step 302, the program of the present invention identifies particular topics based on the responses from the user. For example, if the user indicates a problem in installing application server software, then the topic of installing application server software is identified.

In step 303, the program of the present invention presents a list of identified topics to the user where each topic is associated with a short description of that topic. In one embodiment, when the icon "hovers" over the listed topic (referring to the user placing the icon over the listed topic) on display 238, a short description about that topic appears to the user on display 238. Further, each topic is associated with one or more articles. In one embodiment, when the user selects a topic displayed on display 238, such as by selecting mouse 226 when the icon hovers over the topic, one or more links to articles may appear to the user on display 238. For example, such links may appear to the user on display 238 in a pane, such as pane 102 of FIG. 1.

In step 304, the program of the present invention receives indications of the articles that were selected by the user. As stated above, when the user selects a topic displayed on display 238, such as by selecting mouse 226 when the icon hovers over the topic, one or more links to related articles may appear to the user on display 238. Upon the user selecting one of these links, the article associated with that link is downloaded to computer system 200. The user may be said to have "selected" that article. For each article selected by the user, the following steps, steps 305-312, occur.

Upon the user selecting an article, a list of options are presented to the user on display 238 in step 305. In one embodiment, these options may be presented in the form of check boxes or a radio button.

In the following discussion, steps 306-312 describe the options presented to the user on display 238 upon the user selecting a particular article. In step 306, a determination is made by the program of the present invention as to whether the user wants to print the selected article. In one embodiment, the user is presented with the option of printing the selected article. If the user selects the option to print the selected article, then the selected article is printed in step 307.

Referring now to FIG. 3B, upon the user selecting whether or not to print the selected article, a determination is made by the program of the present invention in step 308 as to whether the user wants to insert the selected article in the mini information center. As stated above, the mini information center may have the appearance and feel of a normal information center (e.g., information center 100 of FIG. 1) but with less informational content as well as having informational content that is targeted towards the user's specific concerns. The informational content of the mini information center is determined by the user by selecting the appropriate articles to be included in the user's personalized mini information center.

In one embodiment, the user is presented with the option of whether to insert the selected article in the mini information center to be built. If the user selects the option to insert the article in the mini information center to be built, then the selected article as well as the associated topic is stored in a directory from which to build the mini information center in step 309. In one embodiment, the directory may reside in disk unit 220 or in non-volatile memory 216.

Upon the user selecting whether or not to insert the article in the mini information center, a determination is made by the program of the present invention in step 310 as to whether the user wants to insert the selected article in a collection of articles to be generated in PDF format. In one embodiment, the user is presented with the option of inserting the selected article in a collection of articles to be generated in PDF format. If the user selects the option to insert the article in a collection of articles to be generated in PDF format, then, in step 311, the selected article is inserted in a collection of articles that is stored in a directory. In one embodiment, the directory is a separate directory from the directory storing the articles and topics to be used to build the mini information center. In one embodiment, the directory storing the collection of articles to be generated in PDF format may reside in disk unit 220 or in non-volatile memory 216.

Upon the user selecting whether or not to insert the selected article in a collection of articles to be generated in PDF format, a determination is made by the program of the present invention in step 312 as to whether there are more articles selected by the user. If there is another article selected by the user, then, in step 305 of FIG. 3A, a list of options is presented to the user on display 238 pertaining to the selected article.

If, however, there are no more articles to be selected by the user, then, in step 313, the program of the present invention builds the mini information center based on the articles and associated topics stored in the directory in step 309. By allowing the user to determine which articles and topics are to be used to create or build the mini information center, the mini information center will contain informational content more targeted to the specific user. As stated above, the mini information center will contain the same look and feel of a normal information center; however, the mini information center will contain informational content targeted to the user thereby enabling the user to access the desired information using less time.

In step 314, the program of the present invention generates a PDF file for the collection of articles stored in the directory in step 311.

It is noted that method 300 may include other and/or additional steps that, for clarity, are not depicted. It is further noted that method 300 may be executed in a different order presented and that the order presented in the discussion of FIGS. 3A-B are illustrative. It is further noted that certain steps in method 300 may be executed in a substantially simultaneous manner.

Figure 1:
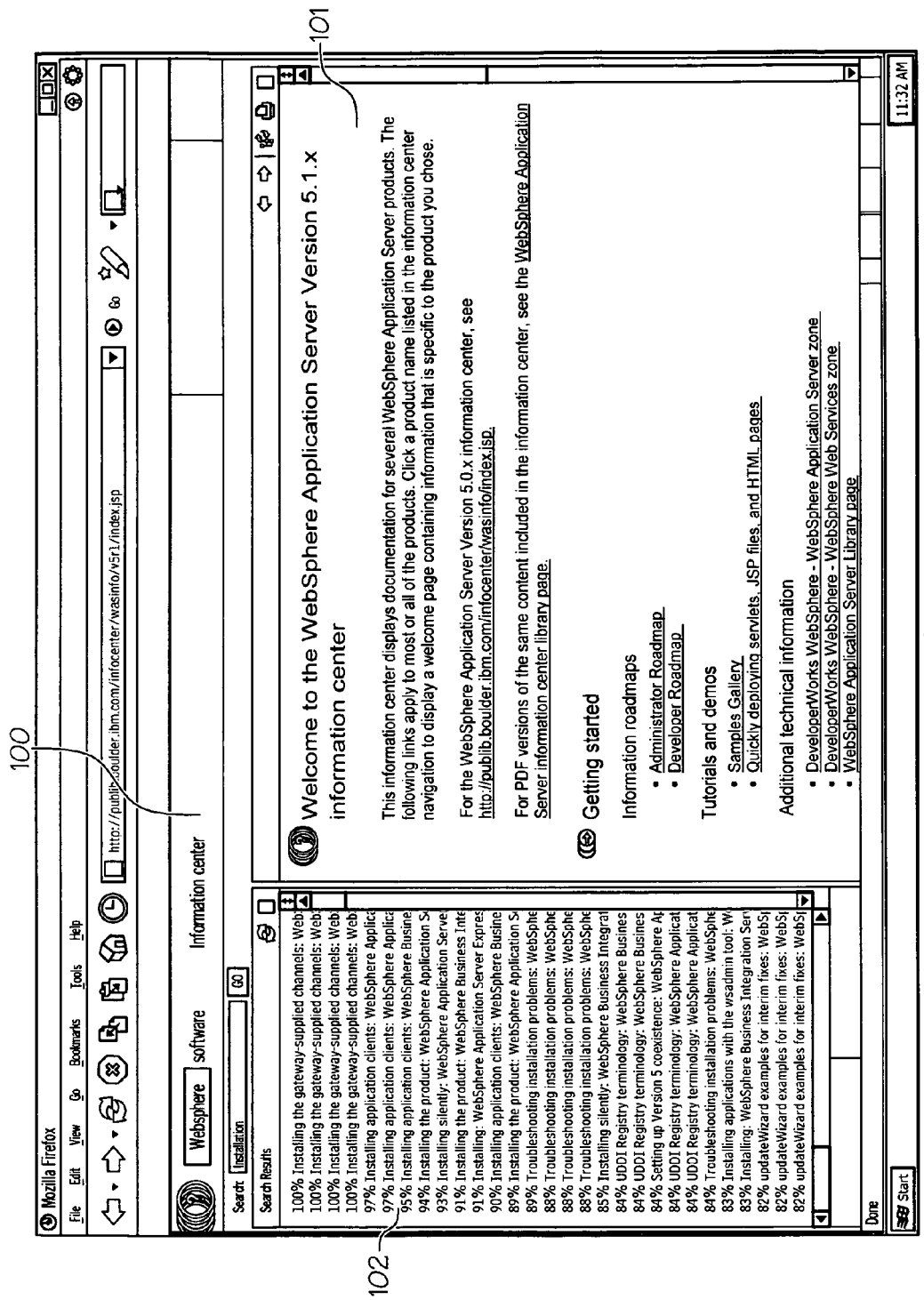
FIG. 1 is a screen shot of an information center.

It is further noted that the mini information center built using the steps of method 300 may be linked to the larger or normal information center, such as information center 100 of FIG. 1. In this manner, the user may be able to obtain additional information than the information provided in the created mini information center.

It is further noted that multiple mini information centers, each being built using the steps of method 300, may be bundled together to form a larger information center, referred to herein as a "pod".

Although the method, computer program product and system are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for creating a mini information center comprising the steps of:
presenting an initial set of questions to a user to answer;
identifying topics of interest based on responses to said initial set of questions from said user;
presenting a list of said identified topics of interest to said user, wherein each of said identified topics of interest is associated with a short description, wherein each of said identified topics of interest is associated with one or more articles;
receiving indications of articles selected by said user;
presenting a list of options associated with each article selected by said user, wherein said list of options comprises an option to store an article selected by said user and store an identified topic of interest associated with said selected article in a first directory from which to build said mini information center; and building, by a processor, said mini information center based on stored articles and associated topics of interest in said first directory.

2. The method as recited in claim 1, wherein a first short description appears on a user's display as an icon hovers over a first identified topic of interest displayed to said user on said user's display.

3. The method as recited in claim 2, wherein a first article is selected upon said user selecting said first identified topic of interest displayed to said user on said user's display, wherein said first identified topic of interest is selected using a pointing device as said icon hovers over said first identified topic of interest displayed on said user's display.

4. The method as recited in claim 3, wherein upon selecting said first identified topic of interest, said first article is generated to be displayed on said user's display.

5. The method as recited in claim 1, wherein said list of options further comprises an option to print an article selected by said user.

6. The method as recited in claim 1, wherein said list of options further comprises an option to insert an article selected by said user in a collection of articles stored in a second directory.

7. The method as recited in claim 6 further comprising the step of: generating said collection of articles stored in said second directory in PDF format.

8. A computer program product embodied in a computer readable medium for creating a mini information center, the computer program product comprising the programming instructions for:

presenting an initial set of questions to a user to answer;

identifying topics of interest based on responses to said initial set of questions from said user;

presenting a list of said identified topics of interest to said user, wherein each of said identified topics of interest is associated with a short description, wherein each of said identified topics of interest is associated with one or more articles;

receiving indications of articles selected by said user;

presenting a list of options associated with each article selected by said user, wherein said list of options comprises an option to store an article selected by said user and store an identified topic of interest associated with said selected article in a first directory from which to build said mini information center; and building said mini information center based on stored articles and associated topics of interest in said first directory.

9. The computer program product as recited in claim 8, wherein a first short description appears on a user's display as an icon hovers over a first identified topic of interest displayed to said user on said user's display.

10. The computer program product as recited in claim 9, wherein a first article is selected upon said user selecting said first identified topic of interest displayed to said user on said user's display, wherein said first identified topic of interest is selected using a pointing device as said icon hovers over said first identified topic of interest displayed on said user's display.

11. The computer program product as recited in claim 10, wherein upon selecting said first identified topic of interest, said first article is generated to be displayed on said user's display.

12. The computer program product as recited in claim 8, wherein said list of options further comprises an option to print an article selected by said user.

13. The computer program product as recited in claim 8, wherein said list of options further comprises an option to insert an article selected by said user in a collection of articles stored in a second directory.

14. The computer program product as recited in claim 13 further comprising the programming instructions for:

generating said collection of articles stored in said second directory in PDF format.

15. A system, comprising:

a memory unit for storing a computer program for creating a mini information center; and a processor coupled to said memory unit, wherein said processor, responsive to said computer program, comprises:

circuitry for presenting an initial set of questions to a user to answer;

circuitry for identifying topics of interest based on responses to said initial set of questions from said user;

circuitry for presenting a list of said identified topics of interest to said user, wherein each of said identified topics of interest is associated with a short description, wherein each of said identified topics of interest is associated with one or more articles;

circuitry for receiving indications of articles selected by said user;

circuitry for presenting a list of options associated with each article selected by said user, wherein said list of options comprises an option to store an article selected by said user and store an identified topic of interest associated with said selected article in a first directory from which to build said mini information center; and circuitry for building said mini information center based on stored articles and associated topics of interest in said first directory.

16. The system as recited in claim 15, wherein a first short description appears on a user's display as an icon hovers over a first identified topic of interest displayed to said user on said user's display.

17. The system as recited in claim 16, wherein a first article is selected upon said user selecting said first identified topic of interest displayed to said user on said user's display, wherein said first identified topic of interest is selected using a pointing device as said icon hovers over said first identified topic of interest displayed on said user's display.

18. The system as recited in claim 17, wherein upon selecting said first identified topic of interest, said first article is generated to be displayed on said user's display.

19. The system as recited in claim 15, wherein said list of options further comprises an option to insert an article selected by said user in a collection of articles stored in a second directory.

20. The system as recited in claim 19, wherein said processor further comprises:

circuitry for generating said collection of articles stored in said second directory in PDF format.

* * * * *